United States Patent Office 2,769,609
Patented Nov. 6, 1956

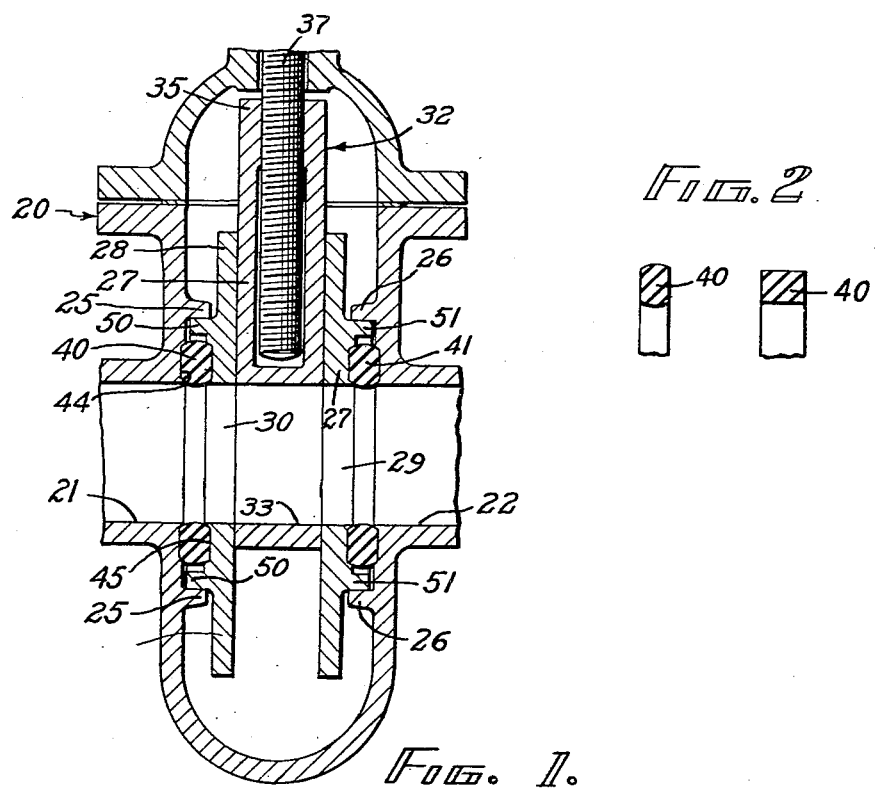

2,769,609

GATE VALVE

Heinrich Blankenagel and Peter Ahls, Duisburg-Hamborn, and Hugo Ebersold, Mannheim, Germany, assignors to Thyssensche Gas- und Wasserwerke G. m. b. H., Duisburg-Hamborn, Germany, and Vereinigte Armaturen-Gesellschaft m. b. H., Mannheim, Germany Application April 13, 1951, Serial No. 220,744

3 Claims. (Cl. 251—196)

This invention relates to slide-action check valves. Slide-action check valves for use in high and low pressure gas, steam and liquid pipe lines must be constructed so as to take into consideration the fact that the fluid flowing through them may carry dirty matter with it, with the consequence that deposits of solid matter such as for example rust or naphthalene tend to form in the pipe line. As is well known, this dirty solid matter readily settles within the slide-action check valves and particularly in the dead space of the casings of such valves. In long distance gas pipe lines particularly, deposits of rust and dust combined with tarry precipitations, lead to considerable difficulties in operation owing to jamming, leaking, faulty closure or complete locking of the slide-action check valves.

With the general object of overcoming these difficulties, slide-action check valves have been proposed in which the check means is in the form of a plate or beam having a pair of parallel sealing surfaces and a bore which in the open position serves as a guide tube. Tight sealing is attained by means of resilient sealing rings which are fixedly connected to the casing. These sealing rings are pre-stressed when fitted into the casing so that a uniform pressure is exerted on the check means in all positions. Slide valves of this kind have, however, the disadvantage that in any intermediate position, such as when the slide valve is half open, the fluid flows through the interior of the casing, and leads to deposits.

Upon transition of the medium flowing through from the state of rest (check valve closed) to a state of flow (check valve open) dirty matter which has accumulated in the meantime is carried along, and is deposited in the inner space of the casing. This leads to breakdown in these check valves.

Moreover slide-action check valves are known in which, instead of the usual sealing rings, plate-like sealing elements are arranged in the casing. The surfaces of these elements which are opposed to the interior of the casing are ground plane. Between these faces, there is fitted a slidable check means or body which is usually constructed in two pieces. The rear face of the body is in the form of a double cone which fits accurately into a corresponding recess in the other piece of the body. In two end positions of the body corresponding to the slide valve being opened or closed, one piece of the body is pressed against the casing and/or the cover, whereby both pieces are wedged outwardly and effect a tight seal.

In practice it is usual to bring these body members into the end positions and then to turn the hand wheel back one quarter to one half of a turn in the closing direction in order to relieve the spindle. Slide-action valves of the latter kind therefore have the disadvantage that the mechanical pressure force acting on the check plates is eliminated when the spindle pressure is relieved. The fluid flowing through presses the plate which faces the direction of flow in an inward direction thereby establishing communication with the interior of the casing. The same drawback is apparent when the slide valve is partly opened. The corresponding narrow gap between the seating faces is sufficient to permit the passage of foreign fine particles such as dust and thereby jeopardises the sealing action. Within a short time the dust and dirt which enters incrusts into a solid mass, and in consequence the valve seizes up.

In other known slide-action check valves attempts have been made to prevent penetration of foreign matter by the provision of an accurately fitting wedge piece in the gap between packing rings in the casing, when the slide valve is open, the wedge having a bore which, in the open position, serves as a guide tube. For this purpose the sealing rings of the casing are made wadge-shaped, with their widened end downward. When the slide valve is opened, these wedge shaped plates move axially and are lifted off the sealing faces. An intermediate piece, which is constructed as a guide tube is then shifted into the gap thus formed. This kind of slide-action valve has not been adopted in practice, since it is found that when the valve spindle is moved to the open position of the slide valve, dust penetrates between the intermediate piece and the rings of the slide valve, and leads to break-down of the valve.

According to the present invention a slide-action check valve for gas, steam or other fluid pipe lines, comprises check means movable between a pair of seating plates fixed in the casing of the valve, the check means comprising one or more movable members having a fluid flow opening which are slidable over the seating plates to open and close the valve, said movable member or members being pressed against the respective seating plates by a pressure member which is movable or resiliently deformable to control the pressure exerted on the seating plates by the movable member or members. The pressure member preferably acts to exert a constant pressure on the movable members not only when the valve is open and closed but also when it is in an intermediate position.

The invention also consists in a slide-action check valve for gas pipe lines comprising a pair of fixed seating plates and a movable check plate which fit closely and are adjustably pressed against one another whilst being sealed against the valve casing by means of packing rings.

The constant pressure loading of the movable members or check plates, independent of the position of the valve, can be effected in various ways according to the invention. For use in high pressure pipe lines, particularly, a two-piece check means is used, the two check plates having obliquely inclined rear faces, the gap between them being filled by a wedge piece, which is loaded by adjustable spring pressure, and which forces the front faces of the check plates against the seating plates which are fixedly arranged in the casing.

For low operational pressures, resilient pre-stressed pressure pieces are conveniently used, and are deformable under pressure, to generate a constant pressure force acting on the seating faces. These pressure members are fitted and pre-stressed with their rear abutment faces between the seating plates, that is between the stationary or movably arranged pair of plates, or between both pairs and their rear abutment faces, as desired.

All of the foregoing and still further advantages and objects of this invention will become apparent from a study of the following specification, taken in connection with the accompanying drawing, wherein:

Figure 1 is a longitudinal sectional view of a valve assembly made in accordance with this invention; and Figure 2 is a detail sectional view of resilient pressure rings forming a part of the apparatus shown in Figure 1.

Referring to Figure 1 of the drawing, a gate valve made in accordance with this invention is shown to include a casing 20 forming a valve chamber with two aligned conduit ports 21, 22 and opposed parallel valve seats 25, 26.

A valve gate assembly is carried by the casing and is shown to include a pair of seating plates 27, 28, each of which has an opening 29, 30, respectively, in alignment with the respective ports 21, 22. The facing sides of the plates 27, 28 provide a guide channel for receiving an axially slidable gate control member 32 that has a flow port 33 at one extremity thereof. The other end 35 of the gate 32 is closed and adapted to prevent the flow through the valve when shifted to blocking engagement with the ports 29, 30 of the seating plates under the action of the operating screw shaft 37 that threadingly and drivingly engages the gate 32.

The seating plates 27, 28 are loosely fitted in the casing for a limited plane, parallel movement relative to the gate 32. A pair of resilient annular pressure members or rings 40, 41 are carried in annular grooves disposed on each side of the valve assembly. One groove is formed by the facing recessed surfaces 44, 45 of the casing 20 and adjacent seating plate 28, respectively. The other groove is similarly formed at the other side of the valve by the facing recessed surfaces 48, 49 of the casing 20 and adjacent seating plate 27, respectively. Each pair of recesses forms a pocket having opposed annular shoulders that are adapted to secure firmly the respective pressure rings therein. The positioning lugs 50, 51 on each respective seating plate 28, 27 are spaced from the associated recesses so as to provide annular spaces adjacent to the outer diameters of each pressure ring. This permits the expansion thereof in an outward radial direction, as well as in the inward radial direction in which case the rings are permitted to project into the flow openings of the assembly.

Referring to Figure 2, the resilient pressure rings are shown in the fitted shape 40 and in the natural shape 40' before being fitted into the assembly. The deformation of the resilient members should take place only on the outer and inner surfaces such as by bulging or a variant thereof. A comparatively high range path of expansion between the relaxed and the tensioned condition of the pressure rings is thereby achieved and this is of decisive importance for the function of the slide valve.

The slide-action check valve according to the present invention effects complete sealing of the interior of the slide valve casing against the fluid flowing through in any position of the slide valve, and thereby prevents deposits, corrosion and the detrimental consequences thereof.

What we claim is:

1. A gate valve for controlling a fluid flow having a casing forming therein a valve chamber provided with two aligned conduit ports and opposed parallel valve seats, and a valve gate assemblage, this said assemblage comprising a pair of seating plates each including a flow opening and facing with one face a casing wall portion defining a respective one of the conduit ports, the opposite faces of the plates forming a guide channel therebetween extending parallel to the planes of the conduit ports, a gate control member fitted axially slidable in said channel and including a flow opening, actuating means operatively coupled with the gate control member for selective axial displacement of the latter in said channel between a position in which said flow opening is in alignment with the conduit ports and a position in which said gate control member blocks a flow of fluid through the conduit ports, the said seating plates being loosely fitted in the casing for a limited plane-parallel movement relative to the respective casing wall portions and the gate control member and guiding said control member throughout the entire axial displacement thereof, and a pair of resilient rings of substantially rectangular cross-section, each abutting with its two face-sides against the respective seating plate and the respective casing wall portion, the inner diameter of said rings defining a flow opening in alignment with the aforesaid flow openings and the seating plates and the respective casing wall portion defining therebetween an annular space of greater diameter than said rings encompassing the outer diameter of said rings to provide for an unimpeded radially inward and outward barrel-like deformation of the rings, each of said rings before assembly having a substantially greater transverse dimension than the transverse dimension of said associated annular space between said seating plate and said casing wall, whereby in assembled relationship with said associated respective casing wall portions and said seating plates each said sealing ring is adapted to urge said respective seating plate into pressure engagement with said casing in all positions of the gate control member relative to the seating plates for providing a sealing fit between the casing and the seating plates in all positions of the gate control member.

2. A gate valve for controlling a fluid flow having a casing forming therein a valve chamber provided with two aligned conduit ports and opposed parallel valve seats, and a valve gate assemblage, the said assemblage comprising a pair of seating plates each including a flow opening and facing with one face a casing wall portion defining a respective one of the guide ports, the opposite faces of the plates forming a guide channel therebetween extending parallel to the planes of the conduit ports, a gate control disc fitted axially slidable in said channel and including a flow opening, actuating means operatively coupled with said disc for selective axial displacement of the latter in said channel between a position in which said flow opening is in alignment with the conduit ports and a position in which the gate control disc blocks a flow of fluid through said ports, the said seating plates being axially extended beyond the perimeter of the conduit ports so as to guide therebetween the gate control disc in all positions thereof and loosely fitted in the casing for a limited plane-parallel movement relative to the respective casing wall portions and the gate control member, and a pair of resilient rings of substantially rectangular cross-section each fitted under pressure between one of the seating plates and the adjacent casing wall portion defining the respective conduit port, the inner diameter of said rings defining a flow opening in alignment with the aforesaid flow openings and the seating plates and the respective casing wall portion defining therebetween an annular space of greater diameter than said rings encompassing the outer diameter of said rings to provide for an unimpeded radially inward and outward barrel-like deformation of the rings, each of said rings before assembly having a substantially greater transverse dimension than the transverse dimension of said associated annular space between said seating plate and said casing wall, whereby in assembled relationship with said associated respective casing wall portion and said seating plates each said sealing ring is adapted to urge said respective seating plate into pressure engagement with said casing in all positions of the gate control disc relative to the seating plates thereby providing a fluidtight seal at the seating plates for all positions of the gate control disc.

3. A gate valve as defined in claim 1, wherein each of the said seating plates is formed with annular shoulder extending toward the respective casing wall, and wherein each of the casing wall portions facing the seating plates is formed with an annular shoulder extending toward the respective seating plate, respective shoulders engaging each other for holding the seating plates in said loosely fitted position and providing said annular space between the casing and each seating plate for said radially inward expansion of the respective resilient ring.

References Cited in the file of this patent

UNITED STATES PATENTS

| 283,479 | Galvin | Aug. 21, 1883 |
| 1,586,345 | Wilson | May 25, 1926 |
| 2,306,490 | Noble | Dec. 29, 1942 |
| 2,482,409 | Fowler | Sept. 20, 1949 |
| 2,488,932 | Penick | Nov. 29, 1949 |
| 2,504,924 | Pennaema | Apr. 18, 1950 |
| 2,510,442 | Volpin | June 6, 1950 |
| 2,525,989 | Works | Oct. 17, 1950 |